UNITED STATES PATENT OFFICE.

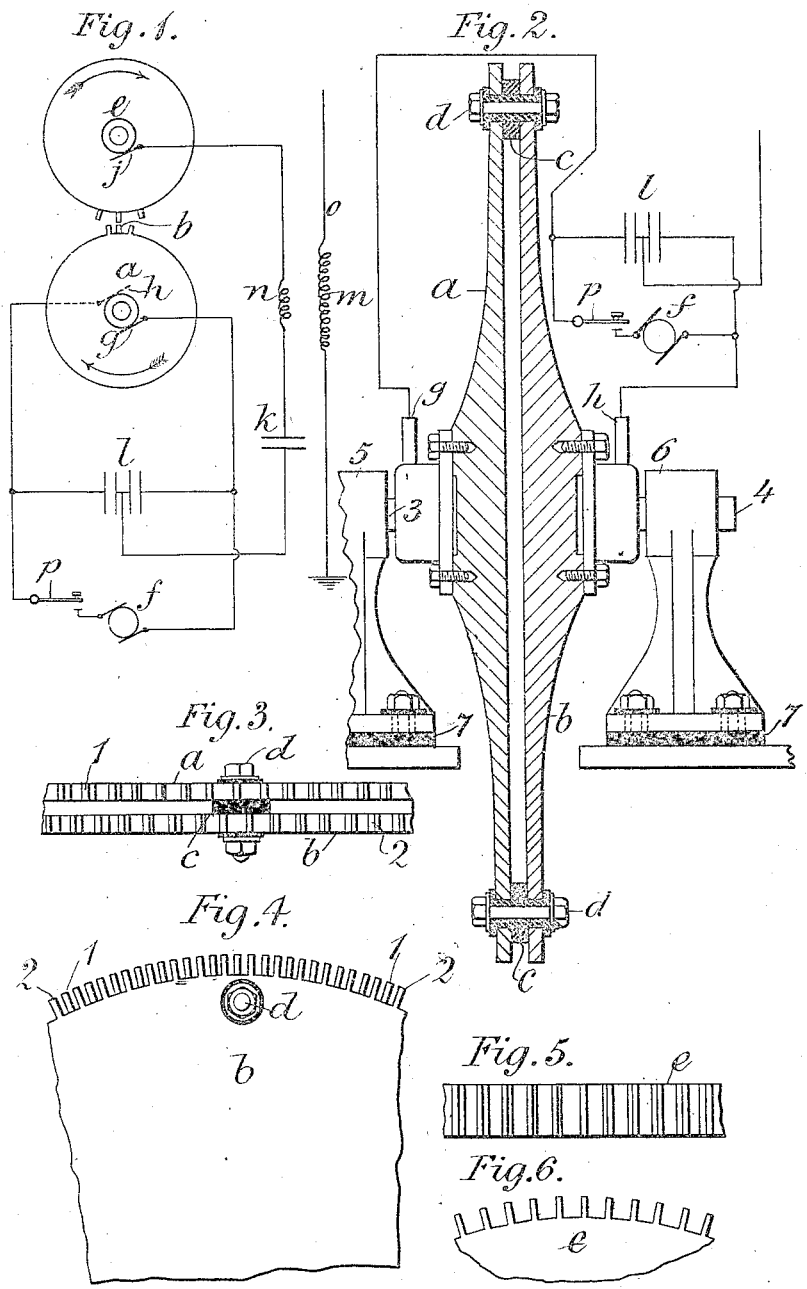

GUGLIELMO MARCONI, OF ADELPHI, LONDON, ENGLAND, ASSIGNOR TO MARCONI WIRELESS TELEGRAPH COMPANY OF AMERICA, OF NEW YORK, N. Y., A CORPORATION OF NEW JERSEY.

TRANSMITTING APPARATUS FOR WIRELESS TELEGRAPHY.

935,381.

Specification of Letters Patent. Patented Sept. 28, 1909.

Application filed October 1, 1907. Serial No. 395,456.

*To all whom it may concern:*

Be it known that I, GUGLIELMO MARCONI, LL. D., D. Sc., a subject of the King of Italy, residing at Watergate House, York Buildings, Adelphi, in the county of Middlesex, England, have invented new and useful Improvements in Transmitting Apparatus for Wireless Telegraphy, of which the following is a specification.

It has before been proposed to employ for wireless telegraphy alternating currents generated without the use of a spark gap, but such attempts have not heretofore resulted in practical success, because owing to the type of apparatus employed the current was insufficient to transmit signals to any considerable distance. It has also been proposed to transform a continuous current into an alternating current by successively charging a condenser the direction of the charging current being reversed after each charge by means of a commutator, but it has been impossible with apparatus of this class to produce alternating currents of a frequency high enough to insure efficient radiation.

According to this invention a novel form of apparatus is employed which is particularly suitable for producing alternating currents of sufficiently high frequency and power efficiently to radiate electric waves.

The arrangements which have been successfully employed are as follows:—A revolving toothed commutator of special construction which may be termed a generator wheel is employed, every alternate tooth of which is connected to one pole of a source of current such as a direct current dynamo, while the other teeth are connected to the other pole. The generator wheel is formed of two metal disks, with equally spaced teeth projecting radially outward from their peripheries. These disks are fixed side by side but are insulated from each other, the teeth of one disk being spaced midway between the teeth of the other, and the bodies of the disks are respectively connected to the two poles of the current generator. With this mode of construction the generator wheel can be rotated at a very considerable speed without danger of damage or of distortion of the teeth which might otherwise result from the action of centrifugal force, and the insulation between the oppositely charged sets of teeth can be made very efficient.

Revolving in the same plane and in the same direction as the generator wheel and in close proximity to it but not in contact with it is a toothed collector consisting of a plain metal disk the outer rim of which is broad enough to carry teeth which will project over the teeth of both disks of the generator wheel, the distance between the teeth on this collector wheel being the same as that between the teeth of either of the two disks of the generator wheel.

The collector wheel is connected through an inductance to one plate of a condenser, (called the working condenser), the other plate of which is connected to the middle point of a pair of condensers (called the reservoir condenser) placed as a shunt across the terminals of the dynamo, the capacity of the reservoir condenser being preferably larger than that of the working condenser. If the reservoir condenser is omitted the working condenser should be connected to a point in the winding of the generator or source of electricity where the potential between the said point and one of the poles is half that existing between the poles. The working condenser may also be omitted the reservoir condenser in this case becoming in effect a pair of oppositely charged condensers which are discharged alternately.

The electromotive force of the source of electricity employed should be sufficient to cause the current to jump the small air space between the teeth of the generator wheel and the teeth of the collector wheel as these pass each other when revolving close together, and in order to prevent short circuits between the teeth of the generator wheel as they pass the collector it is desirable that the space between the teeth should be large compared to the space between the edges of the teeth of the collector and generator wheels.

By surrounding the spark-gap, including the generator and collector wheels, by compressed air, or by the use of a jet of compressed air, in any well known way, higher electromotive forces may be employed in the spark-gaps. I do not claim these features as a part of my invention, their use being well known in the art.

As it is necessary to rotate the above described bars or disks at a considerable speed these should be constructed in such a manner and of such material as safely to allow of a high peripheral speed such as is obtained in high speed turbine wheels. The disks can be advantageously coupled or geared to rapidly revolving electric motors or steam turbines, and the collector and generator disks or contacts should be electrically insulated from earth and from the motor by which they are rotated. It has been found practicable to obtain a peripheral speed of over 400 meters per second on a collector wheel and 200 meters per second on a generator wheel, and by using teeth sufficiently closely spaced an alternating current of over 100,000 periods per second can be obtained.

An inductive or conductive connection is made between the circuit containing the collector or generator wheel and the transmitting antenna. The inductance and resistance of the circuit and the capacity of the working condenser should be such that at the speed at which the generator and collector wheels are driven it is just charged in the period of time during which the collector is taking current from each tooth of the generator. A variable non-inductive resistance in the circuit also facilitates the adjustments.

By means which are now well known the period of oscillation of the aerial should be brought into resonance with the period of the alternating currents circulating in the above mentioned circuit. The oscillations transmitted through space can be detected at a receiving station by means of the well known receivers or detectors employed for wireless telegraphy, it being especially desirable when using the waves generated in the manner described to utilize to the utmost the principle of resonance in the receivers. The receivers should preferably contain a responsive oscillation circuit with as little damping as possible. In consequence of the fact that the oscillations emanating from the transmitter may be continuous it will in that case be desirable to arrange well known means, such as a short circuit or make and break, by which the detector only intermittently forms part of the receiving oscillation circuit.

The transmitting apparatus may be arranged to transmit regular groups of oscillations instead of a continuous stream, in which case the teeth of the disks are arranged in groups alternately with blank spaces, and in this case the receivers may be tuned to respond to the periodicity of these groups of oscillations as well as to the periodicity of the oscillations which go to constitute each group.

In place of employing a continuous current dynamo, an alternator or transformer may be employed, but in this case the periodicity of its current should be low compared with that of the current produced as above described.

The drawings show the form of apparatus it is preferred to employ.

Figure 1 is a diagram of the transmitting apparatus showing one method of connecting the circuits. Fig. 2 is a sectional view of a generator wheel taken substantially on a diameter thereof and showing diagrammatically the manner of connecting the same to the sending circuit. Figs. 3 and 4 are respectively plan and elevational views of a portion of the generator wheel. Figs. 5 and 6 are respectively plan and elevational views of a portion of the collector wheel.

$a$ and $b$ are solid disks of metal having teeth 1, 2 cut on their peripheries. These disks are insulated from each other by a ring of mica or vulcanite $c$. The disks are fixed together by bolts $d$ which are insulated from the disks by insulating washers and bushes. As will be seen the teeth 1 and 2 alternate with each other. The disks have bolted to them shafts 3, 4 the bearings 5 and 6 of which are mounted on insulating plates 7. The corresponding collector wheel $e$ is made in one piece of metal, its teeth being at the same distance apart as the teeth 1 or 2 and the bearings of its shaft are mounted on insulating plates.

$f$ is a continuous current dynamo having its poles connected to brushes $g$ and $h$ in contact with the disks $a$ and $b$ respectively.

$j$ is a brush in contact with the collector wheel and connected to one plate of the working condenser $k$ the other plate of which is connected to a neutral plate in the reservoir condenser $l$ in a shunt across the poles of the dynamo $f$.

$m$ and $n$ are the primary and secondary of an ordinary jigger employed in wireless telegraphy and $o$ is the antenna.

$p$ is a sending key or similar circuit controlling device for defining the signals transmitted.

What I claim is:—

1. In transmitters for wireless telegraphy, the combination with a sending circuit, mechanically operated means for positively completing and interrupting said circuit synchronously with the time period of Hertzian oscillations of definite frequency.

2. In transmitters for wireless telegraphy, the combination with a sending circuit, mechanically operated means for positively reversing the current in said circuit synchronously with the time period of Hertzian oscillations of definite frequency.

3. In a transmitter for wireless telegraphy, the combination with an oscillatory circuit, mechanically operated means for positively completing and interrupting said circuit synchronously with its time period of each oscillation.

4. In transmitters for wireless telegraphy, the combination of an oscillatory circuit, a condenser therein, means for supplying current for charging the condenser, and mechanically operated means for positively discharging said condenser synchronously with the time period of each oscillation.

5. In transmitters for wireless telegraphy, the combination with an oscillatory circuit, a toothed generator wheel, means coöperating with the means of said wheel to form a spark gap, and means for rotating said wheel at a definite speed to complete and interrupt said circuit synchronously with the time period of each oscillation.

6. In a transmitter for wireless telegraphy, the combination with an oscillatory circuit, a toothed generator wheel, means for imparting an opposite polarity to every alternate tooth of the wheel, means coöperating with the teeth of said wheel to form a spark gap and means for rotating said wheel at a definite speed to complete and interrupt said circuit synchronously with the time period of each oscillation.

7. In transmitters for wireless telegraphy, the combination of a toothed generator wheel, means for imparting an opposite polarity to every alternate tooth of the wheel, and a toothed collector wheel.

8. In transmitters for wireless telegraphy, the combination of a toothed generator wheel, means for imparting an opposite polarity to every alternate tooth of the wheel, a toothed collector wheel, a conductor connected to the teeth of the collector wheel, and a condenser connected to the conductor.

9. In transmitters for wireless telegraphy, the combination of a toothed generator wheel, a source of current, a conductor leading from one pole of the source of current to every alternate tooth of the generator wheel, a second conductor leading from the other pole to the other teeth, a condenser provided with a neutral plate placed in a shunt between the two conductors, a toothed collector wheel, and a conductor connecting the teeth of the collector wheel to the neutral plate of the condenser.

10. In transmitters for wireless telegraphy, the combination of a toothed generator wheel, a source of current, a conductor leading from one pole of the source of current to every alternate tooth of the generator wheel, a second conductor leading from the other pole to the other teeth, a condenser provided with a neutral plate placed in a shunt between the two conductors, a toothed collector wheel, a conductor connecting the teeth of the collector wheel to the neutral plate of the condenser, and a second condenser in the last mentioned conductor.

11. In transmitters for wireless telegraphy, a spark gap comprising two parallel toothed disks fixed together but insulated from each other, the teeth of each disk being equally spaced apart, and the teeth of the respective disks being situated alternately in a circumferential direction.

12. In transmitters for wireless telegraphy, a mechanically operated spark gap comprising, two parallel rotatable toothed disks fixed together but insulated from each other, the teeth of each disk being equally spaced apart, and the teeth of the respective disks being situated alternately in a circumferential direction, and a rotating part coöperating with said wheel to bring each of said teeth into action successively.

13. In transmitters for wireless telegraphy, a spark gap consisting of two parallel toothed disks of metal fixed together but insulated from each other, the teeth of one disk alternating with the teeth of the other.

14. In transmitters for wireless telegraphy, the combination of parallel toothed disks of metal fixed together but insulated from each other, a source of current, a conductor leading from one pole of the source of current to one disk, a second conductor leading from the other pole to the other disk, a condenser provided with a neutral plate placed in a shunt between the two conductors, a toothed collector wheel, and a conductor connecting the teeth of the collector wheel to the neutral plate of the condenser.

15. In transmitters for wireless telegraphy, the combination of parallel toothed disks of metal fixed together but insulated from each other, a source of current, a conductor leading from one pole of the source of current to one disk, a second conductor leading from the other pole to the other disk, a condenser provided with a neutral plate placed in a shunt between the two conductors, a toothed collector wheel, a conductor connecting the teeth of the collector wheel to the neutral plate of the condenser, and a second condenser in the last mentioned conductor.

16. In transmitting apparatus for wireless telegraphy, a rotatable body, means for rotating said body at a high speed, terminals located adjacent said rotatable body and forming spark gaps therewith, a source of electric energy connected with said terminals, a condenser connected in parallel with said terminals, and an oscillatory circuit connected with said rotatable body and with the middle point or neutral plate of said condenser.

GUGLIELMO MARCONI.

Witnesses:
G. S. KEMP,
R. B. RAUSFORD.